US009470597B2

(12) United States Patent
Kurtz et al.

(10) Patent No.: US 9,470,597 B2
(45) Date of Patent: *Oct. 18, 2016

(54) WIRELESS INTERFACE FOR A PLURALITY OF TRANSDUCERS

(75) Inventors: Anthony D. Kurtz, Saddle River, NJ (US); Wolf S. Landmann, Fair Lawn, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 971 days.

This patent is subject to a terminal disclaimer.

(21) Appl. No.: 13/449,482

(22) Filed: Apr. 18, 2012

(65) Prior Publication Data

US 2012/0200425 A1 Aug. 9, 2012

Related U.S. Application Data

(63) Continuation of application No. 12/459,108, filed on Jun. 26, 2009, now Pat. No. 8,175,839.

(51) Int. Cl.
  *G08C 15/06* (2006.01)
  *G01L 19/08* (2006.01)
  *G01D 1/00* (2006.01)
  *G01D 15/00* (2006.01)
(52) U.S. Cl.
  CPC .............. *G01L 19/086* (2013.01); *G01D 1/00* (2013.01); *G01D 15/00* (2013.01)
(58) Field of Classification Search
  USPC .......................................................... 702/13
  See application file for complete search history.

(56) References Cited

U.S. PATENT DOCUMENTS

| 8,140,358 B1* | 3/2012 | Ling ...................... G06Q 40/08 340/439 |
| 8,395,496 B2 | 3/2013 | Joshi et al. |
| 2006/0237628 A1* | 10/2006 | Moody ................ H04N 5/3651 250/208.1 |
| 2010/0152947 A1* | 6/2010 | Denholm et al. ............... 701/29 |

OTHER PUBLICATIONS

Shang-Ming Chang, An Efficient Broadcast Authentication Scheme in Wireless Sensor Networks, ASIACCS'06, Mar. 21-24, 2006, Taipei, Taiwan, pp. 311-320.*
Understanding 802.1X authentication for wireless networks, Jan. 21, 2005, 6 pages.*

* cited by examiner

*Primary Examiner* — Tung Lau
(74) *Attorney, Agent, or Firm* — Troutman Sanders LLP; James E. Schutz; Mark Lehi Jones

(57) ABSTRACT

A wireless interface system that interfaces with any one of a plurality of transducers of different types, such as pressure sensors, temperature sensors, and current probes. The transducers employ identical connectors with a common connecting scheme. In this manner, any transducer can be connected to a wireless interface which has the same input connection scheme. When the wireless interface is connected to the transducer, a rechargeable battery, which is associated with the wireless interface, is activated. The wireless interface then determines the type of transducer being utilized and provides sufficient circuitry as well as determining the requirements of the connected transducer. In this manner, the wireless interface, besides recognizing and determining the type of transducer, can determine the range of the sensor and can provide specific circuitry to be activated to supply power and to read data from the sensor via common output pins.

8 Claims, 2 Drawing Sheets

WIRELESS INTERFACE FOR A PLURALITY OF TRANSDUCERS

CROSS-REFERENCE TO RELATED APPLICATION

This application is a continuation application claiming priority to U.S. patent application Ser. No. 12/459,108, filed 26 Jun. 2009, the contents of which are hereby incorporated by reference as if fully set forth herein.

FIELD OF THE INVENTION

The present invention relates to transducers in general and more particularly to a wireless interface for retrieving data from a plurality of transducers of different types.

BACKGROUND OF THE INVENTION

As one can ascertain, there are many transducer which are employed for various measurements. A very popular type of transducer is the pressure transducer or pressure sensor. Such devices measure pressure in a given environment, other devices such as temperature sensors measure temperature, current probes measure current as well as other devices such as tachometers to measure speed of rotation and, as one can ascertain, many other so called transducers.

In many applications, a plurality of different transducers are used which may monitor conditions of one particular item or many items. For example, in a vehicle, one may monitor oil pressure, the rotational speed, the current drain from the battery, the temperature of the passenger compartment or of the engine. Thus, as one can ascertain, there are many systems which utilize many different types of transducers for many different applications. In order to monitor such transducers, one requires different apparatus for each device. For example, each device may have a different output voltage, may produce a different signal and have other requirements which differ from device to device.

In order to accommodate each of these devices, the user must have separate output equipment to accommodate each device. Thus one may utilize a different type of output device to measure pressure as compared to temperature and so on. It is a desire in modern technology to provide a device which is capable of transmitting a wireless signal to remote receiver locations. The ability of utilizing wireless connections is apparent and it is extremely desirable to use wireless connections for monitoring the output of transducer. For example, see U.S. Pat. No. 7,283,922 issued on Oct. 16, 2007 entitled Transducer Employing Wireless Transmissions for Sending and Receiving Signals to A. D. Kurtz, et al. In this patent, there is shown a transducer implemented to operate with transmitted frequency signals. These transmitted signals provide a biased potential to the transducer and enable the transducer to transmit a transducer output signal to a remote location. The transducer has an antenna for receiving transmitted signals. The antenna is coupled to a rectifier circuit, the rectifier is operated to provide a DC voltage in response to received transmitted signals. Thus the device is capable of transmitting a wireless signal indicative of the transducer output to a monitoring station. The monitoring station as well as the transducer device utilize a tuned antenna, thus enabling wireless communications between the transducer and the remote location.

The above-noted patent describes the use of a wireless system for a piezoresistive array for measuring pressure. Piezoresistive arrays for pressure measurement are well known and the assignee herein, namely Kulite Semiconductor Products, Inc. supplies many such pressure transducer devices to the industry. In any event, as one will ascertain, it is desirable to utilize a wireless connection having the ability to interface with many transducers of different types and different ranges. Such devices will have, for example, an improved battery life and improved accuracy. Thus it is an object of the present invention to provide a system for retrieving data from a plurality of different transducers using the same wireless interface.

SUMMARY OF THE INVENTION

Apparatus for transmitting data from any selected one of a plurality of different transducer types, comprising: a plurality of transducer types, each one capable of monitoring only one associated condition whereby a first transducer of said plurality can monitor a totally different condition than any other one of said plurality, each transducer having different input and output requirements in regard to proper input operating signals and output signals identification means associated with each transducer for providing an identification of said transducer with respect to said monitored condition, a plurality of identical connector means, each one connected to one associated transducer, with each connector output coupled to said associated transducer according to said input and output requirements, a wireless interface means having means responsive to said identification means for identifying the exact type of transducer connected and for supplying the proper input signal requirements to said connected transducer and including means for responding to said output signals according to said transducer and transmitting means for transmitting a wireless signal to a remote location indicative of said transducer output signal and said transducer type.

DETAILED DESCRIPTION OF THE INVENTION

Figure 1:
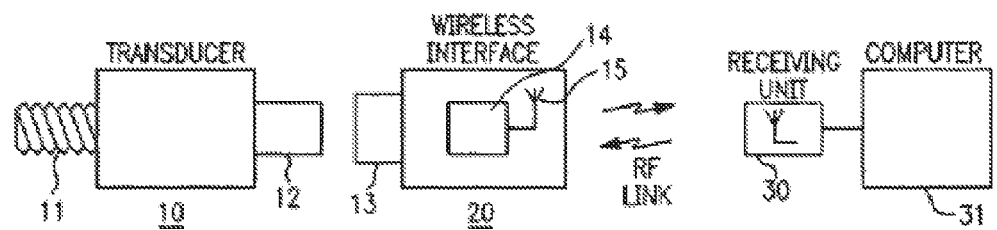
FIG. 1 is a block diagram depicting a wireless sensor system according to this invention.

Referring to FIG. 1, there is shown a block diagram of a wireless sensor system capable of accommodating a plurality of different transducers. As seen in FIG. 1, a transducer 10 has an input port 11. The input port 11 is used to interface with an environment to be monitored by the transducer 10. For example, if the transducer 10 is a pressure transducer, then the input port 11 will be coupled to a source of pressure, such as the pressure of engine oil and so on. In a similar manner, if the transducer 10 is a temperature sensor, then input port 11 would be coupled to an environment in which the temperature is to be measured. In any event, the transducer 10 could be one of several different types. For example, as indicated above, the transducer 10 may be a pressure sensor, a temperature sensor, a current probe, a tachometer, an accelerometer and so on. In regard to the present invention, all transducers such as 10 are furnished with an output connector 12. The output connector 12 is preferably a male connector but can be a female connector as well. The connector 12 is employed with any transducer which is accommodated by a particular user. The connector 12 is the same for all transducers which may be used. Essentially, as indicated, all transducers 10 have identical output connectors 12 with a common connection scheme. As will be further explained, the transducers 10 also have means to uniquely identify the sensor type and the range of the sensor which will be designated as sensor ID which basically is sensor identification (SID). The sensor ID (SID) can be a resistor having a different value for each type of transducer or a different value for each range. In any event, a preferred way of implementing the sensor ID (SID) is to employ a programmable memory, as will be explained. Again, as indicated, the transducer 10 has an output connector 12. All transducers have the identical output connector.

Also shown in FIG. 1 is a wireless interface module 20. The wireless interface module has an input connector 13 which mates with output connector 12 of the transducer. Thus any transducer can be inserted and plugged in to the wireless interface 20. As will be explained, the wireless interface contains a processor as 14 and an antenna as 15. Thus, the transducer output as directed through connector 12 is now provided to the wireless interface 20 through the connector 13. The wireless interface operates to transmit the data from the transducer via antenna 15. There is shown a receiving unit 30 which receives the transmitted signal and a computer 31 which is coupled to the receiving antenna. The computer 31 deciphers the transmitted signal as received by the antenna of the receiving unit 30. The transmitted signal contains the sensor data and also contains the transducer type, the range and other pertinent information. The means for transmitting this data is described in the above-noted U.S. Pat. No. 7,283,922. The specific transmission protocol, encoding, modulation and so on, can be of many different types as is well known. For example, one can use Bluetooth, Zigbee and so on for transmitting the data and such systems are widely employed and well-known.

Figure 2:
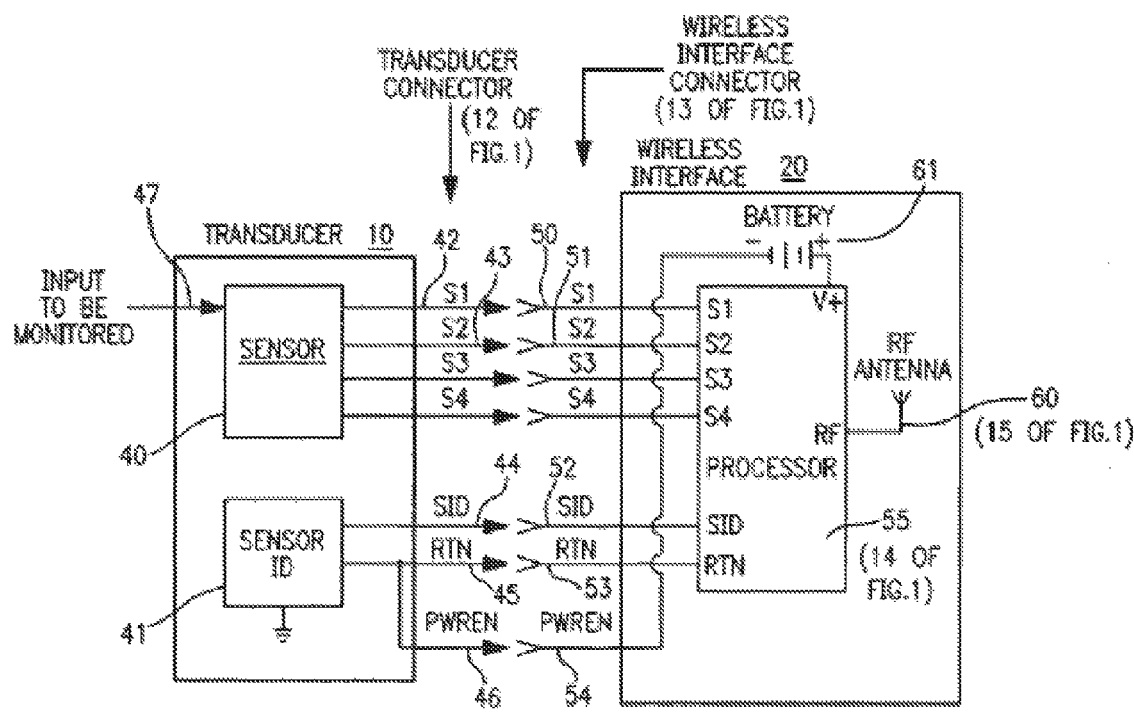
FIG. 2 is a block diagram showing a transducer connected to a wireless interface according to this invention.

Referring to FIG. 2, there is shown a more detailed block diagram of the transducer and wireless interface. As seen in FIG. 2, the transducer 10 which as indicated above can be any type of transducer. Depending upon the type, the transducer will employ a sensor 40 which basically will be responsive to an input applied to the input port 47. The input to be monitored may be pressure whereby the sensor will be a pressure sensor such as a piezoresistive array or other type of pressure transducer. If the input to be monitored was temperature, then the sensor 40 would be a thermistor or an RTD element or a bridge. Thus if sensor 40, for example, is a tachometer, a reed contact would be connected. As seen, the sensor has leads such as 42 and 43, also designated as S1-S4. These leads are assigned for the sensor function. For example, as indicated above, the connectors of all the transducer such as connector 12 of FIG. 1 are all identical. In this manner, several pins, such as four pins, are assigned for the sensor function. Thus as shown in the Figure, pins 42 and 43 also are designated as S1, S2 while there are two other pins designated as S3 and S4. If the sensor is a piezoresistive sensor, it would require four pins as S1-S4 where two pins would be used for the input biasing voltage and two pins for the output voltage. For other types of sensors, the same pins would be utilized, for example, a sensor might only require two pins. If the sensor 40 is a current probe using a Hall effect sensor, three of the output pins would be used for the input voltage and the fourth pin used for the output voltage. Thus pins S1-S4, which are shown as four pins in FIG. 2 are employed to interface with any sensor type. There are other pins associated with the transducer 10 via the output connector 12. There is a pin 44 which is designated as SID which is the sensor identification as discussed above. This pin is connected to a sensor ID circuit 41.

As indicated, the sensor ID may be a resistor of a different value for each different sensor. Thus for a pressure sensor, the resistor may be of one value while for a temperature sensor, the resistor may be ten times that value and for other transducer or sensor type, the resistor may be ten times greater for that value. In this manner, by having large differences between resistors, one can easily determine the type of sensor. In any event, the sensor ID preferably is implemented with a programmable memory 41. By using a programmable memory, one has many advantages. The programmable memory can contain the transducer type as well as the transducer range, and can further be programmed with additional individual sensor data. This data can be calibration and compensation data. In this manner, the programmable memory 41 can transmit to the wireless interface the calibration compensation data whereby the processor contained in the wireless interface can use this data to compensate the output signals received accordingly. Further, by using a programmable memory 41, the data can also contain the sensor part number, serial number, manufacturing date, the last calibration date and so on. This enhances the logistics and maintenance of the system as this information is provided. While the SID is shown as a single output 44, it is understood that multiple outputs or multiple pins can accommodate the SID signal.

Also shown is a output pin labeled PWREN, this is for power energizing. Thus pin 46 is also connected to pin 45 designated as RTN which is a power return pin. As seen in FIG. 2, there is shown the wireless interface 20 which has pins which identically correspond to the pins of the transducer connector. Thus the wireless interface 20 has input pins 50 and 51 which correspond to pins S1 and S2 of the sensor. It has a pin 52 which corresponds to pin 44 of the sensor ID and a pin 53 which corresponds to the pin 45. As seen, a battery 61 is associated with the wireless interface. The battery 61 may be a rechargeable battery, and essentially the battery 61 is provided a ground return path via lead 54 PWREN. Thus when the transducer 10 connector is inserted into the wireless interface connector, ground is coupled to the battery 61 thereby energizing the battery and applying operating voltage to the wireless interface processor 55. Thus as seen, the wireless interface 20 is activated only when it is connected to a transducer 10. The wireless interface 20, as indicated, has the internal rechargeable battery 61 which supplies power to the entire circuit of the wireless interface, as well as supplying power to the sensor 40 and sensor ID 41. As seen, the battery 61 is activated only when the wireless interface is connected to the sensor. The pins 46 and 54 both designated as PWREN make connection only when transducer 10 is connected to the wireless interface 20 via its associated connectors. This method of activating the battery 61 only when connected to the sensor, has the advantage of eliminating a need for an on/off switch. By eliminating the on/off switch, the wireless interface can be enclosed in a hermetically sealed case. This allows the use of the wireless interface in hostile environments such as high humidity, corrosive liquids or gases and so on. The elimination of the on/off switch also avoids the discharge of the battery if the switch is left inadvertently in the on position.

Thus as seen from FIG. 2, the transducer 10 and the wireless interface communicate via connectors as 12 and 13 of FIG. 1. Once the connectors are placed, the battery 61 energizes and supplies power to the wireless interface. The wireless interface has an internal processor 55, which may be a microprocessor which controls all of the functions of the interface. When the power is turned on by connecting the interface to a sensor 40, the processor 55 then reads the SID. By reading the SID, the microprocessor 55 determines the sensor type and range of the sensor. The microprocessor also accesses the programmable memory 41 and may prompt the memory to supply additional data regarding other characteristics of the particular sensor being employed the transducer 10. For example, the processor 55 would know that the sensor is a Wheatstone bridge and may request that the compensating data for the bridge be supplied so that the microprocessor 55 can compensate the output of the bridge as applied to terminals S1-S4 so that the output voltage can be compensated according to the particular pressure sensor being employed. The data from the sensor is digitized by the processor 55 and transmitted via antenna 60 using an RF carrier and an appropriate modulation.

Together with the sensor data, one can also send the transducer type, the range and other pertinent information. As indicated above, there are many means for transmitting this data, as for example described in the above-noted patent U.S. Pat. No. 7,283,922. The data is sent via the wireless interface and received by an appropriate receiver connected to a computer. It is understood from the above-noted description, that the wireless interface is provided with a connector 13, which connector mates with all connectors 12 of any different type of transducer. The same wireless interface 20 can be connected to any of the transducer of any type or any range. In any event, if multiple sensors have to be read simultaneous in a system, then each sensor must be connected to an individual wireless interface as 20. All the wireless interfaces are identical and function as described in conjunction in FIG. 2. Thus, multiple transmission signals may be had, which each transmitter then capable of operating at a different frequency, whereby the receiver 30 would be a wide band receiver. It is conventional to enable operation of each different transmitter at a different frequency so that the receiver can scan the entire band and frequency select each transmission and interpret each transmission as selected. One can also utilize a scheme similar to that described in the above-noted 922 patent whereby a wireless signal can be sent from the receiving unit to selectively bias each transducer according to a different frequency associated with each transducer.

One aspect of the present invention is to utilize a plurality of different transducers which all have identical connectors with a common connection scheme to enable each of the different transducers to interface with a common universal wireless interface for wireless transmission of the transducer signals. It is also understood and apparent that once the transducer is plugged into the wireless adapter and the SID is read, then the processor 55 upon determining the type of transducer being employed can then alter the RF frequency accordingly. Thus for a pressure transducer the processor 55 would specify one RF frequency output. If a temperature transducer is detected by processor 55, then another RF frequency would be transmitted. In this manner, one can provide a simple receiver which can respond to the multiple frequencies as determined by the particular transducer selected. The bandwidth at each frequency can be relatively narrow as there is not a great deal of data to be transmitted. Thus one can have a very efficient receiver which can accommodate a plurality of different transducers. Thus it is seen that using this technique one may employ a large number of transducers, each associated with its own wireless interface and each capable of transmitting a different frequency or each having a different modulation to whereby the receiver would be responsive to any of the frequencies in this range or determining the type of modulation would know what the transducer is and how the modulation is to be interpreted. It is understood that the multiplexing can be accomplished by many different techniques. For example, a different frequency may be assigned to each wireless interface and so on. Other possible multiplexing techniques can include time division multiplexing, code division multiplexing and so on.

Figure 3:
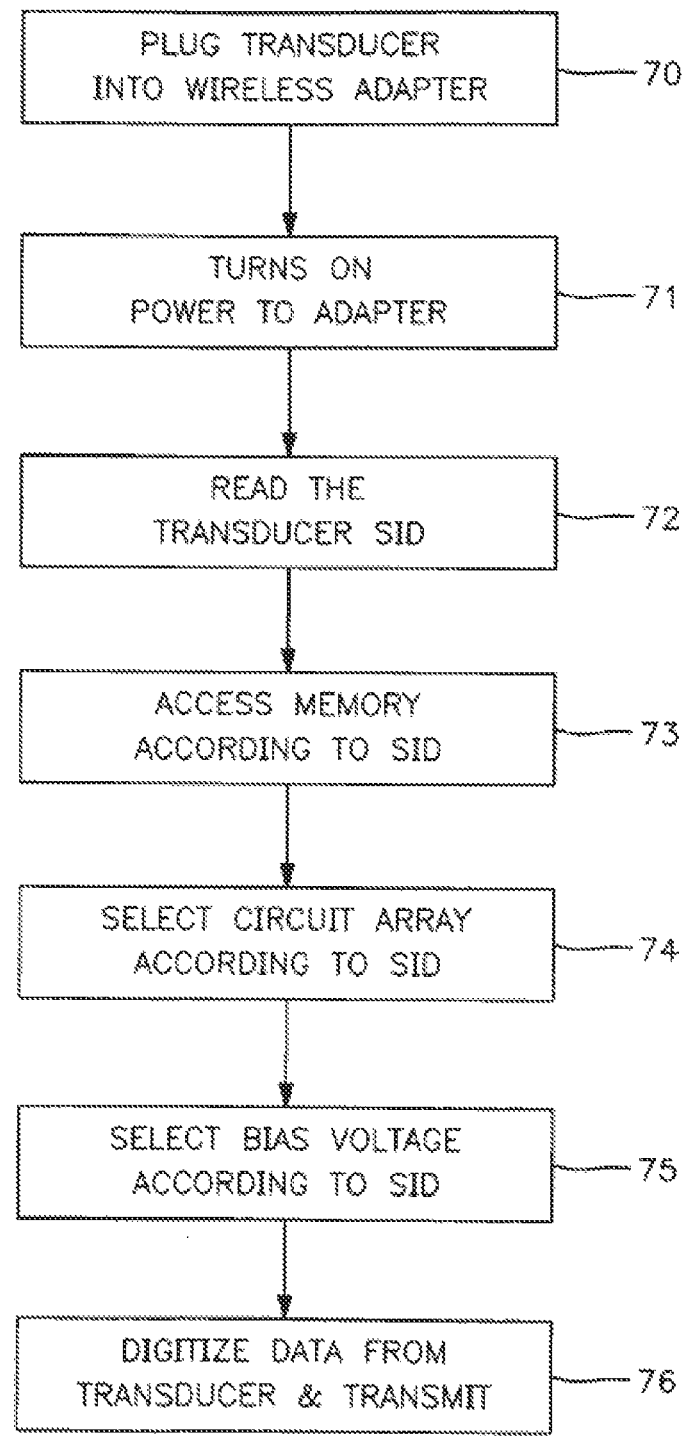
FIG. 3 is a block diagram showing the specs provided in implementing operation of the system.

Referring to FIG. 3 there is shown a simple block diagram indicating the sequences which are provided by the system. It is noted in FIG. 3 that the sequences do not necessarily have to be performed in the order indicated, but some of the sequences can be performed simultaneously. One skilled in the art would understand this. Thus as seen by module 70, a transducer which can be any type of transducer is plugged into the wireless adapter. As indicated, any transducer used in this system has the same mating connector which can plug into the wireless adapter as shown in step 70. When the transducer is plugged into the wireless adapter as shown in module 71, power is provided to the adapter via the associated rechargeable battery. The system then reads the sensor ID or SID. In this manner, the processor knows exactly what type of sensor is being employed and knows exactly what type of signal is to be expected from the sensor on output pins S1-S4. As soon as the SID is recognized, the processor accesses its memory according to the SID as indicated in module 73. In this manner, the processor now provides biasing to the transducer or sensor once knowing the type of sensor and selects a circuit arrangement according to the detected SID. For example and as indicated, if the sensor is a Wheatstone bridge array, the processor would select an output resistive configuration which may include a span resistor and so on, to appropriately interface with the pressure transducer output. If the SID determines that it was a thermistor then the processor may select a half bridge array or some other resistive array to interface with the SID.

As indicated, the processor would select a biasing voltage as supplied to the particular sensor according to the SID, and as indicated, would digitize the data received from the particular transducer, select an output frequency to indicate to the receiver the type of transducer as well as supplying the receiver with the specific ID for that particular transducer type. Thus is seen that there are multiple advantages of using the present system, which advantages all relate to the method of retrieving data from several transducers of different types using the same wireless interface. By employing such devices as compared to conventional method, one obtains the ability to provide a wireless connection from many transducers of different types or ranges as well as improve battery life and improve accuracy. Thus a major advantage of the system is to enable biasing of the sensor when the wireless adapter is plugged into the sensor or transducer. It is thus believed that one skilled in the art may discern various modifications and alternate embodiments, all of which are deemed to be encompassed by the spirit and the scope of the claims appended herein.

The invention claimed is:

1. A method, comprising:
    monitoring, by a first transducer of a plurality of transducers, a first surrounding physical condition;
    receiving, at a processor, a transducer identification signal from the first transducer;
    identifying, by the processor, and responsive to the received identification signal, a transducer type of the first transducer;

providing transducer requirements to the first transducer based on the identified transducer type, wherein the transducer requirements include a bias voltage;

compensating an output of the processor based on the identified transducer type;

receiving, at the processor, a transducer output signal indicative of the monitored first surrounding physical condition;

detecting, by the processor, a quantity of transducers in the plurality of transducers;

selecting a transmission mode based on the identified transducer type and on the detected quantity of transducers, wherein selecting the transmission mode includes selecting a different frequency based on the identified transducer type and on the detected quantity of transducers; and transmitting, via the selected transmission mode, a wireless signal indicative of the output signal.

2. The method according to claim 1, wherein transducer requirements include power.

3. The method according to claim 1, wherein the first transducer is a pressure transducer.

4. The method according to claim 1, wherein the first transducer is a temperature transducer.

5. The method according to claim 1, wherein identifying the transducer type comprises reading a memory component associated with the first transducer.

6. The method according to claim 1, wherein identifying the transducer type comprises selecting a circuit array for the first transducer.

7. The method according to claim 1, wherein providing transducer requirements comprise providing a bias voltage.

8. The method according to claim 1, further comprising digitizing the transducer output signal.

* * * * *